United States Patent
Lee

(10) Patent No.: US 9,581,439 B1
(45) Date of Patent: Feb. 28, 2017

(54) IMAGE CAPTURE DEVICE WITH A CALIBRATION FUNCTION AND CALIBRATION METHOD OF AN IMAGE CAPTURE DEVICE

(71) Applicant: Etron Technology, Inc., Hsinchu (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 14/964,587

(22) Filed: Dec. 10, 2015

(30) Foreign Application Priority Data

Aug. 24, 2015 (TW) .............................. 104127456 A

(51) Int. Cl.
 *H04N 17/00* (2006.01)
 *G01B 21/04* (2006.01)
 *G01B 7/004* (2006.01)
 *G01B 11/00* (2006.01)

(52) U.S. Cl.
 CPC ........... *G01B 21/042* (2013.01); *G01B 7/004* (2013.01); *G01B 11/002* (2013.01); *H04N 17/002* (2013.01)

(58) Field of Classification Search
 CPC ...... H04N 17/002; H04N 17/00; H04N 17/02; G06T 15/10; G06T 15/20; G06T 17/10
 USPC ......... 348/180, 187, 188, 175, 207.99–207.2
 IPC ............................................. H04N 17/00,17/02
 See application file for complete search history.

(56) References Cited

U.S. PATENT DOCUMENTS

| 8,818,132 B2 * | 8/2014 | Zhang ................... G06T 7/0018 382/154 |
| 2003/0043303 A1 * | 3/2003 | Karuta ............... G02B 27/0025 348/744 |

FOREIGN PATENT DOCUMENTS

CN 102592264 A 7/2012

* cited by examiner

*Primary Examiner* — Sherrie Hsia
(74) *Attorney, Agent, or Firm* — Winston Hsu; Scott Margo

(57) ABSTRACT

An image capture device includes at least one image capture unit and a calibration unit. A calibration method of the image capture device includes an image capture unit of the at least one image capture unit capturing a first image, the calibration unit executing a global calibration operation on original coordinates of all image points of the first image to generate first rectification coordinates of the all image points, the calibration unit finding a geometric graph including each image point of at least one image point of the all image points according to first rectification coordinates of the each image point of the at least one image point of the all image points, and the calibration unit rectifying the first rectification coordinates of the each image point to second rectification coordinates of the each image point according to a rectification equation corresponding to the geometric graph.

16 Claims, 8 Drawing Sheets

IMAGE CAPTURE DEVICE WITH A CALIBRATION FUNCTION AND CALIBRATION METHOD OF AN IMAGE CAPTURE DEVICE

BACKGROUND OF THE INVENTION

1. Field of the Invention

The present invention relates to an image capture device with a calibration function and a calibration method of an image capture device, and particularly to an image capture device and a calibration method that can execute a global calibration operation on images captured by the image capture unit, and then execute a local calibration operation on the images executed by the global calibration operation to boost accuracy of the global calibration function.

2. Description of the Prior Art

Generally speaking, an image capture device usually has geometric errors and assembly tolerance due to characteristics of a lens of the image capture device or an assembly process of the image capture device during the assembly process of the image capture device. The prior art provides complicated mathematical models to rectify the geometric errors and the assembly tolerance of the image capture device. That is to say, the mathematical models provided by the prior art are used for simulating physical behavior of the image capture device to reduce the geometric errors and the assembly tolerance of the image capture device.

However, in fact, the mathematical models provided by the prior art cannot completely simulate the physical behavior of the image capture device due to factors of optical characteristics of the image capture device, resulting in images captured by the image capture device having poor quality. Therefore, how to boost accuracy of the prior art executing a calibration operation on the image capture device becomes an important issue.

SUMMARY OF THE INVENTION

An embodiment of the present invention provides a calibration method of an image capture device, wherein the image capture device comprises at least one image capture unit and a calibration unit. The calibration method includes an image capture unit of the at least one image capture unit capturing a first image; the calibration unit executing a global calibration operation on original coordinates of all image points of the first image to generate first rectification coordinates of the all image points of the first image; the calibration unit finding a geometric graph comprising each image point of at least one image point of the all image points according to first rectification coordinates of the each image point of the at least one image point of the all image points; and the calibration unit rectifying the first rectification coordinates of the each image point of the at least one image point of the all image points to second rectification coordinates of the each image point of the at least one image point of the all image points according to a rectification equation corresponding to the geometric graph.

Another embodiment of the present invention provides an image capture device with a calibration function. The image capture device includes at least one image capture unit and a calibration unit. An image capture unit of the at least one image capture unit captures a first image. The calibration unit is coupled to the at least one image capture unit for executing a global calibration operation on original coordinates of all image points of the first image to generate first rectification coordinates of the all image points of the first image, finding a geometric graph including each image point of at least one image point of the all image points according to first rectification coordinates of the each image point of the at least one image point of the all image points, and rectifying the first rectification coordinates of the each image point of the at least one image point of the all image points to second rectification coordinates of the each image point of the at least one image point of the all image points according to a rectification equation corresponding to the geometric graph.

The present invention provides an image capture device with a calibration function and a calibration method of an image capture device. The image capture device and the calibration method first utilize a calibration unit to execute a global calibration operation on original coordinates of all image points of an image captured by an image capture unit to generate first rectification coordinates of the all image points of the image, and then utilize the calibration unit to find a rectification equation corresponding to a geometric graph including each image point of at least one image point of the all image points of the image according to first rectification coordinates of the each image point of the at least one image point of the all image points of the image to rectify the first rectification coordinates of the each image point of at least one image point of the all image points of the image to second rectification coordinates of the each image point of at least one image point of the all image points of the image. Because the rectification equation corresponding to the geometric graph including the each image point of the at least one image point of the all image points is only applied to the geometric graph including the each image point of the at least one image point of the all image points, the present invention can boost accuracy of the second rectification coordinates of the each image point of the at least one image point of the all image points through the rectification equation corresponding to the geometric graph including the each image point of the at least one image point of the all image points.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
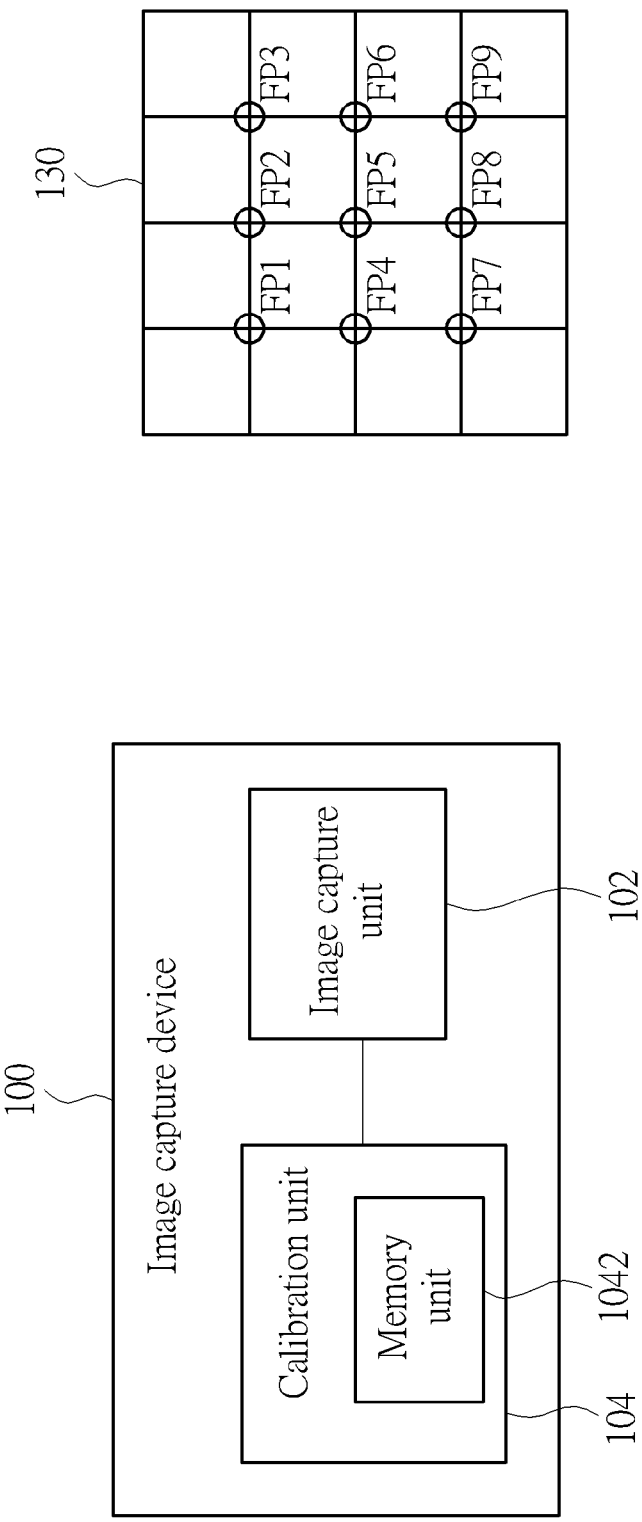
FIG. 1 is a diagram illustrating an image capture device with a calibration function according to a first embodiment of the present invention and a target calibration pattern.

Please refer to FIG. 1. FIG. 1 is a diagram illustrating an image capture device 100 with a calibration function according to a first embodiment of the present invention and a target calibration pattern 130, wherein the target calibration pattern 130 is a real chart. As shown in FIG. 1, the image capture device 100 includes an image capture unit 102 and a calibration unit 104, wherein the calibration unit 104 is coupled to the image capture unit 102. But, the present invention is not limited to the image capture device 100 only including one image capture unit. That is to say, the image capture device 100 can also include a plurality of image capture units. In addition, as shown in FIG. 1, the target calibration pattern 130 has 9 feature points FP1-FP9. But, the present invention is not limited to the target calibration pattern 130 having the feature points FP1-FP9.

Figure 2:
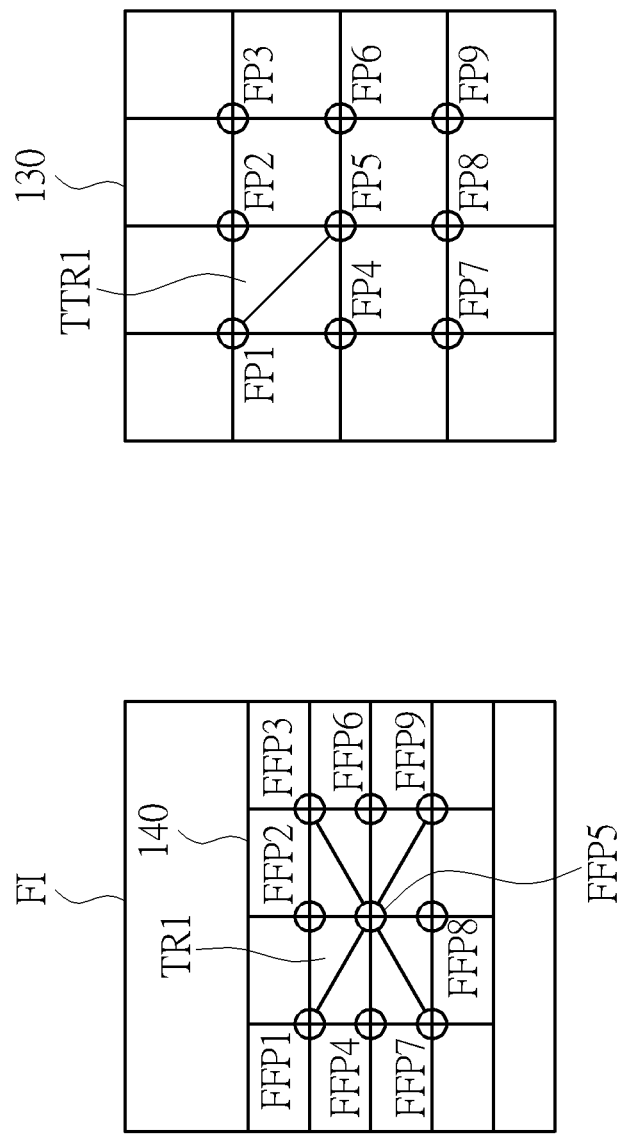
FIG. 2 is a diagram illustrating a first image including a calibration pattern.

The image capture unit 102 first executes an image capture operation on the target calibration pattern 130 to generate a first image FI including a calibration pattern 140 (as shown in FIG. 2), wherein the calibration pattern 140 corresponds to the target calibration pattern 130. Because the target calibration pattern 130 has the feature points FP1-FP9, the calibration pattern 140 shown in the first image FI also has 9 feature points FFP1-FFP9. The calibration unit 104 divides the calibration pattern 140 shown in the first image FI into a plurality of triangles (e.g. the feature points FFP1, FFP2, FFP5 form a triangle TR1) according to the feature points FFP1-FFP9. But, the present invention is not limited to the calibration unit 104 dividing the calibration pattern 140 shown in the first image FI into the plurality of triangles according to the feature points FFP1-FFP9. That is to say, the calibration unit 104 can also divide the calibration pattern 140 shown in the first image FI into a plurality of rectangles or a plurality of polygons according to the feature points FFP1-FFP9. After the calibration unit 104 divides the calibration pattern 140 shown in the first image FI into the plurality of triangles, the calibration unit 104 can determine a rectification equation corresponding to the triangle TR1 of the plurality of triangles according to coordinates of feature points FP1, FP2, FP5 included in a target geometric graph TTR1 corresponding to the triangle TR1 of the plurality of triangles and coordinates of the feature points FFP1, FFP2, FFP5 included in the triangle TR1, wherein the target geometric graph TTR1 is included in the target calibration pattern 130. For example, the feature points FFP1, FFP2, FFP5 correspond to the feature points FP1, FP2, FP5 respectively, and coordinates of the feature point FFP1 are $(X_1, Y_1)$, coordinates of the feature point FFP2 are $(X_2, Y_2)$, coordinates of the feature point FFP5 are $(X_3, Y_3)$, corresponding coordinates of the feature point FP1 in the first image FI are $(X_1', Y_1')$, corresponding coordinates of the feature point FP2 in the first image FI are $(X_2', Y_2')$, corresponding coordinates of the feature point FP5 in the first image FI are $(X_3', Y_3')$. Therefore, the calibration unit 104 can determined coefficients a, b, c, d, e, f of the rectification equation corresponding to the triangle TR1 according to the coordinates of the feature points FFP1, FFP2, FFP5, the corresponding coordinates of the feature points FP1, FP2, FP5, and equations (1)-(6):

$$X_1' = aX_1 + bY_1 + c \quad (1)$$

$$Y_1' = dX_1 + eY_1 + f \quad (2)$$

$$X_2' = aX_2 + bY_2 + c \quad (3)$$

$$Y_2' = dX_2 + eY_2 + f \quad (4)$$

$$X_3' = aX_3 + bY_3 + c \quad (5)$$

$$Y_3' = aX_3 + bY_3 + c \quad (6)$$

Because $X_1, Y_1, X_2, Y_2, X_3, Y_3, X_1', Y_1', X_2', Y_2', X_3', Y_3'$ are known, the coefficients a, b, c, d, e, f of the rectification equation corresponding to the triangle TR1 can be determined by equations (1)-(6). After the calibration unit 104 determines the coefficients a, b, c, d, e, f of the rectification equation corresponding to the triangle TR1 according to the coordinates of the feature points FFP1, FFP2, FFP5, the corresponding coordinates of the feature points FP1, FP2, FP5, and equations (1)-(6), the calibration unit 104 can store the coefficients a, b, c, d, e, f in a memory unit 1042 of the calibration unit 104. In addition, the calibration unit 104 can also utilize the above mentioned method to generate rectification equations corresponding to other triangles shown in the first image FI, so further description thereof is omitted for simplicity. In addition, in another embodiment of the present invention, the image capture device 100 includes at least two image capture units and an image capture unit of the at least two image capture unit has been calibrated before the image capture device 100 is shipped, so an image including the target calibration pattern 130 captured by the image capture unit can also act as a target calibration pattern.

Figure 3:
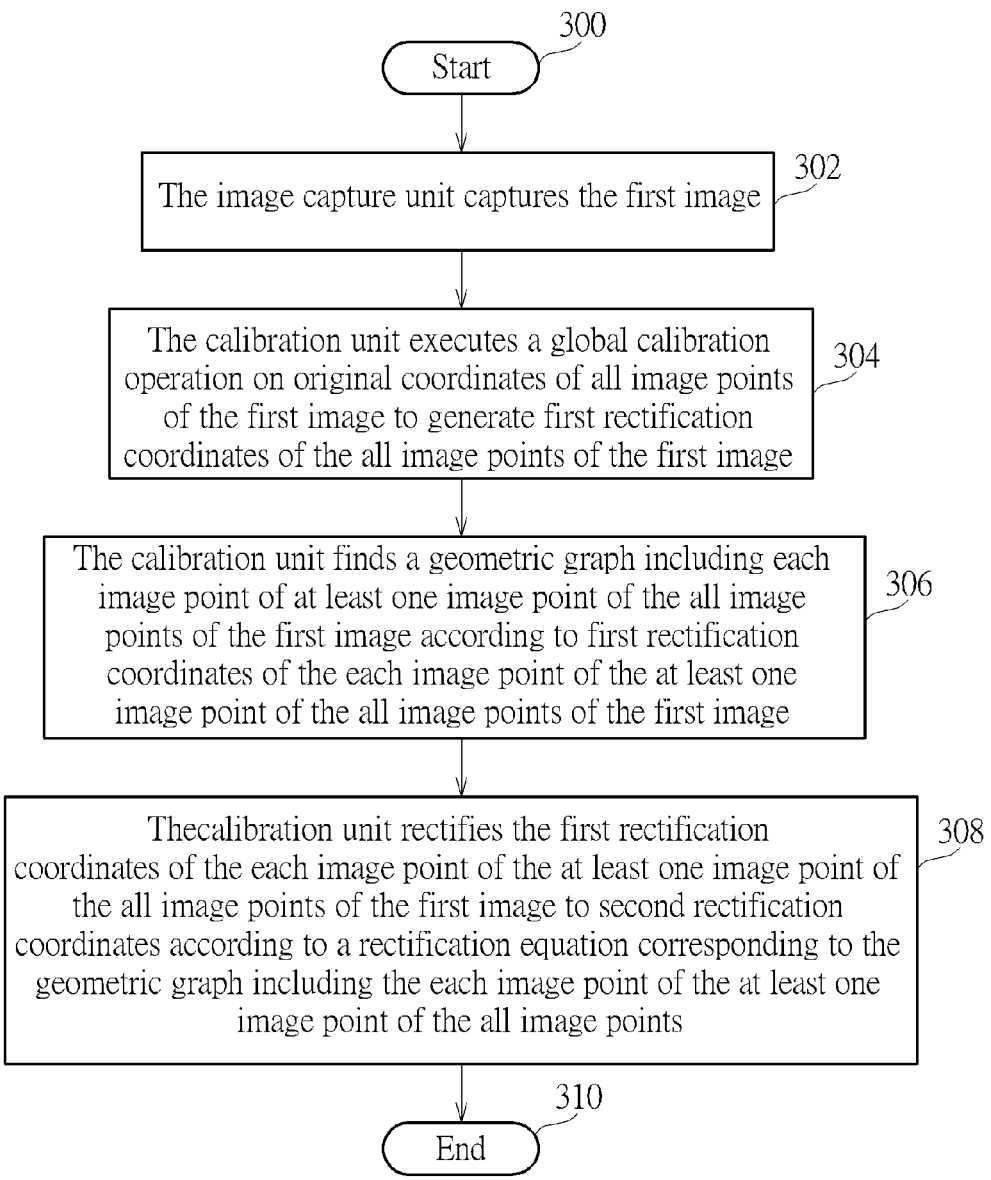
FIG. 3 is a flowchart illustrating a calibration method of an image capture device according to a second embodiment of the present invention.

Please refer to FIGS. 1-3. FIG. 3 is a flowchart illustrating a calibration method of an image capture device according to a second embodiment of the present invention. The calibration method in FIG. 3 is illustrated using the image capture device 100 in FIG. 1. Detailed steps are as follows:

Step 300: Start.

Step 302: The image capture unit 102 captures the first image FI.

Step 304: The calibration unit 104 executes a global calibration operation on original coordinates of all image points of the first image FI to generate first rectification coordinates of the all image points of the first image FI.

Step 306: The calibration unit 104 finds a geometric graph including each image point of at least one image point of the all image points of the first image FI according to first rectification coordinates of the each image point of the at least one image point of the all image points of the first image FI.

Step 308: The calibration unit 104 rectifies the first rectification coordinates of the each image point of the at least one image point of the all image points of the first image FI to second rectification coordinates according to a rectification equation corresponding to the geometric graph including the each image point of the at least one image point of the all image points.

Step 310: End.

Figure 4:
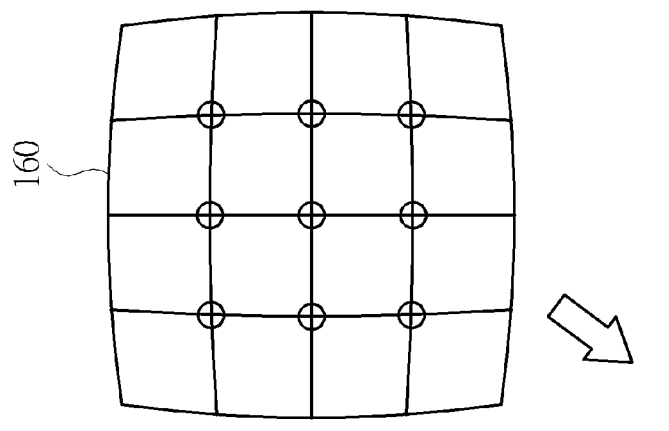
FIG. 4 is a diagram illustrating the calibration pattern shown in the first image FI being a Pincushion Distortion pattern or a Barrel Distortion pattern.
Figure 4:
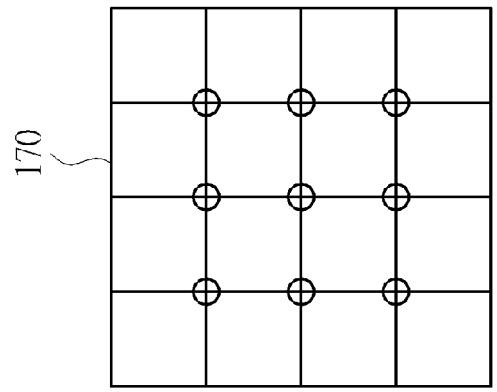
Figure 4:
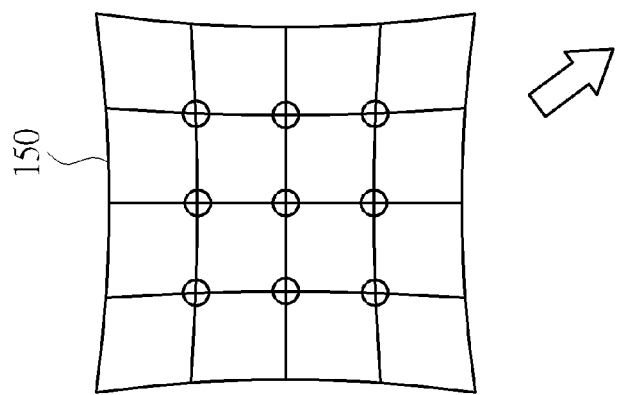

In Step 302, each image point of the all image points of the first image FI is generated by a corresponding pixel of the image capture unit 102. In Step 304, the calibration unit 104 utilizes a global calibration model provided by the prior art to execute the global calibration operation on the original coordinates of the all image points of the first image FI to generate the first rectification coordinates of the all image points of the first image FI, and to make first rectification coordinates of each image point of the all image points of the first image FI match corresponding coordinates of the target calibration pattern 130. For example, as shown in FIG. 4, when the calibration pattern 140 shown in the first image FI is a Pincushion Distortion pattern 150 or a Barrel Distortion pattern 160, the calibration unit 104 can utilize the global calibration model provided by the prior art to execute the global calibration operation on the original coordinates of the all image points of the first image FI to make the first rectification coordinates of the each image point of the all image points match the corresponding coordinates of the target calibration pattern 130. That is to say, the calibration unit 104 can utilize the global calibration model provided by the prior art to make the Pincushion Distortion pattern 150 or the Barrel Distortion pattern 160 become a rectangle pattern 170.

Figure 5:
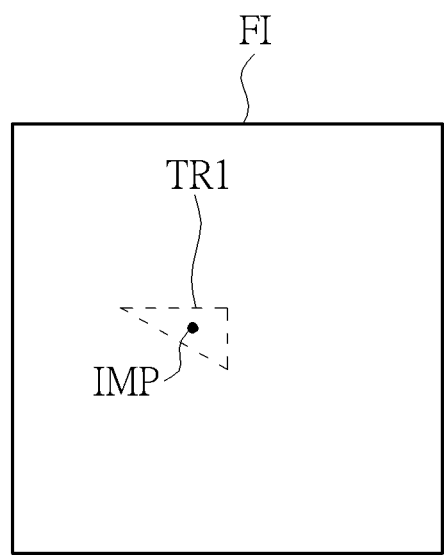
FIG. 5 is a diagram illustrating an image point of the first image being located within the triangle.

In Step 306, after the first rectification coordinates of the all image points of the first image FI are generated, the calibration unit 104 can find the geometric graph including the each image point of the at least one image point of the all image points of the first image FI according to the first rectification coordinates of the each image point of the at least one image point of the all image points of the first image FI. That is to say, the calibration unit 104 can find a geometric graph including the each image point of the all image points (or partial image points of the all image points) of the first image FI according to the first rectification coordinates of the each image point of the all image points (or the partial image points of the all image points) of the first image FI. In Step 308, because the global calibration model provided by the prior art cannot be applied to every image point of the all image points of the first image FI, the calibration unit 104 can rectify the first rectification coordinates of the each image point of the at least one image point of the all image points of the first image FI to the second rectification coordinates according to the rectification equation corresponding to the geometric graph including the each image point of the all image points (or the partial image points of the all image points) of the first image FI. For example, as shown in FIG. 5, an image point IMP of the first image FI is located within the triangle TR1, wherein the triangle TR1 is represented by dashed lines. Therefore, after the calibration unit 104 utilizes the global calibration model provided by the prior art executes the global calibration operation on original coordinates of the image point IMP to generate first rectification coordinates of the image point IMP, the calibration unit 104 can rectify the first rectification coordinates of the image point IMP to second rectification coordinates of the image point IMP according to the rectification equation corresponding to the triangle TR1. Thus, because the rectification equation corresponding to the triangle TR1 is only applied to the triangle TR1 (that is, the triangle TR1 is only used for simulating physical behavior of local pixels of the image capture unit 102 corresponding to the triangle TR1, and is not applied to other triangles within the first image FI), the calibration unit 104 can boost accuracy of the second rectification coordinates of the image point IMP through the rectification equation corresponding to the triangle TR1.

Figure 6:
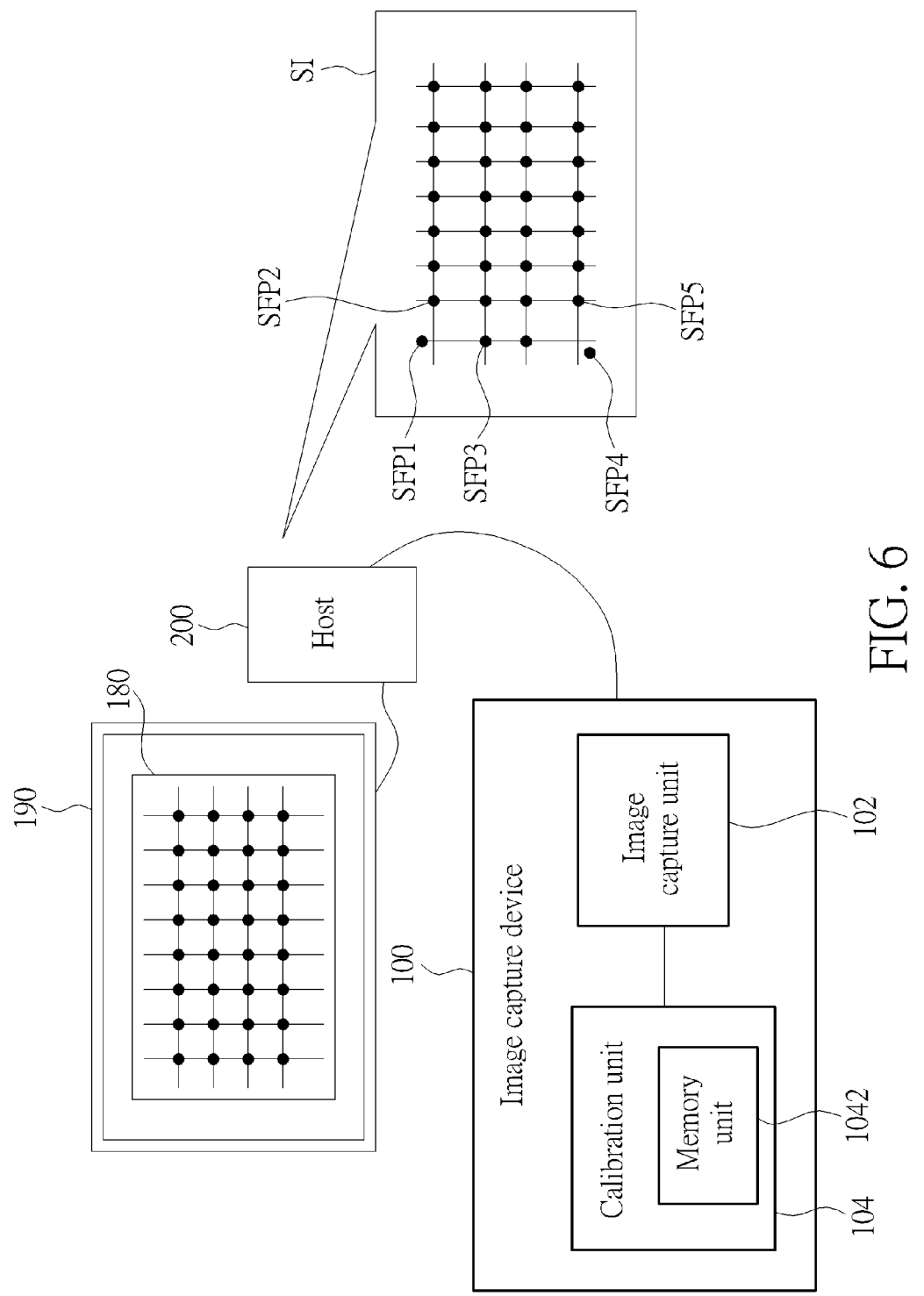
FIG. 6 is a diagram illustrating a programmable target calibration pattern shown on a display screen.
Figure 7:
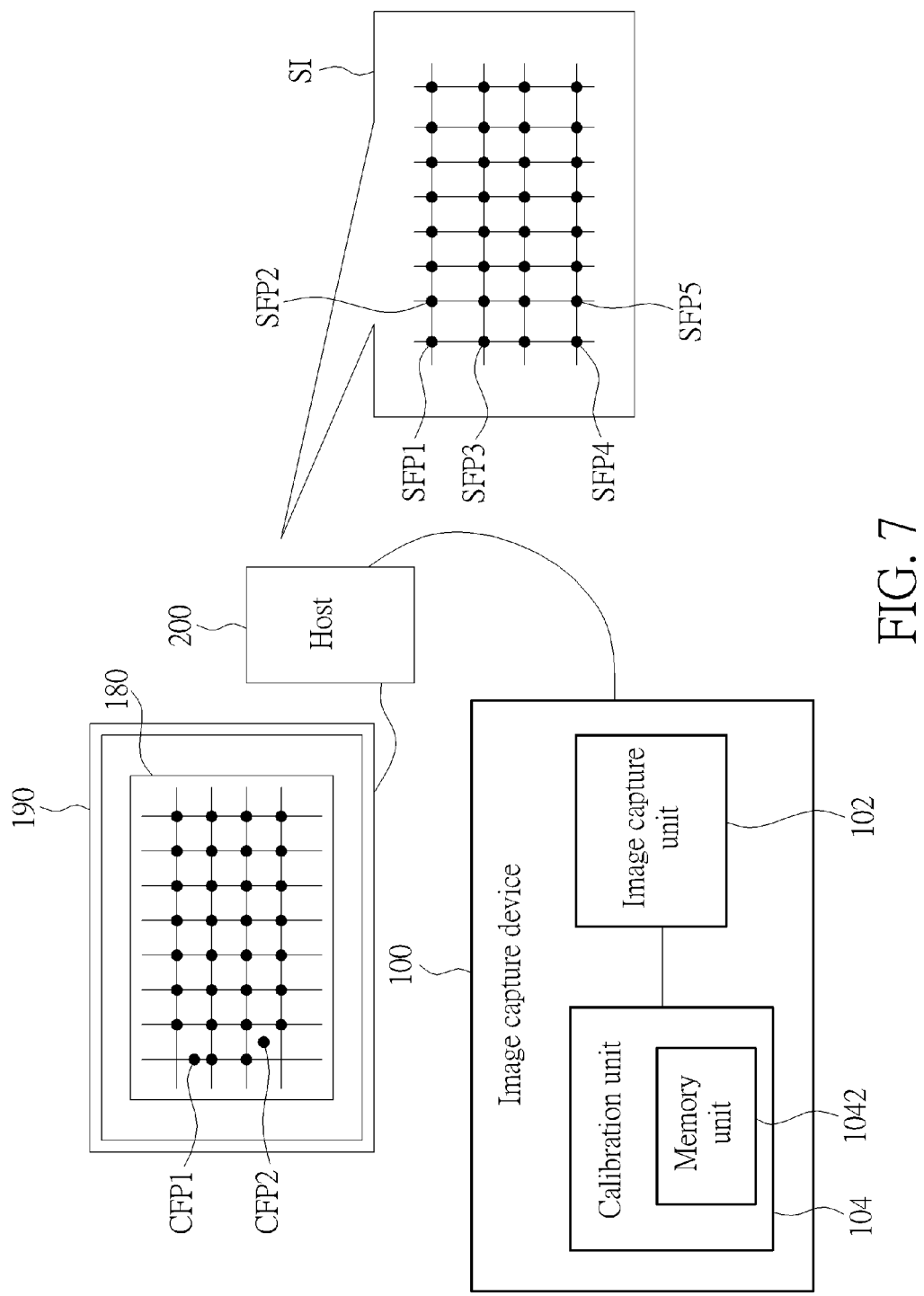
FIG. 7 is a diagram illustrating a plurality of geometric graphs formed by all feature points of the second image being a plurality of rectangles after the host adjusts the positions of the feature points displayed on the display screen.

However, because the calibration unit 104 may not find the geometric graph (e.g. the above mentioned triangle TR1) including the each image point of the all image points (or the partial image points of the all image points) of the first image FI easily according to the first rectification coordinates of the each image point of the all image points (or the partial image points of the all image points) of the first image FI, in another embodiment of the present invention, the present invention provides a programmable target calibration pattern 180 shown on a display screen 190 (as shown in FIG. 6), wherein a host 200 is electrically connected to the display screen 190 and the image capture device 100. As shown in FIG. 6, after the image capture unit 102 executes an image capture operation on the programmable target calibration pattern 180 to generate a second image SI to the host 200, although feature points of the programmable target calibration pattern 180 displayed on the display screen 190 can forma plurality of rectangles, some feature points of the second image SI displayed by the host 200 and corresponding feature points of the second image SI may not form rectangle(s) together (e.g. a feature point SFP1 of the second image SI and feature points SFP2, SFP3 of the second image SI cannot form a rectangle together, and a feature point SFP4 of the second image SI and feature points SFP5, SFP3 of the second image SI cannot form a rectangle together). Therefore, as shown in FIG. 7, the host 200 can repeatedly adjusts positions of feature points CFP1, CFP2 (corresponding to the feature points SFP1, SFP4 of the second image SI) of the programmable target calibration pattern 180 displayed on the display screen 190 until the feature point SFP1 and the feature points SFP2, SFP3 can form a rectangle together, and the feature point SFP4 and the feature points SFP5, SFP3 can form a rectangle together. As shown in FIG. 7, after the host 200 adjusts the positions of the feature points CFP1, CFP2 displayed on the display screen 190, a plurality of geometric graphs formed by all feature points of the second image SI can be a plurality of rectangles. Thus, the calibration unit 104 can utilize the above mentioned method to generate rectification equations corresponding to the plurality of rectangles formed within the second image SI. Because the calibration unit 104 only needs information of four sides of a rectangle the plurality of rectangles formed within the second image SI to define a position of the rectangle the plurality of rectangles formed within the second image SI, the calibration unit 104 does not need the memory unit 1042 with high capacity to store all information corresponding to the plurality of rectangles formed within the second image SI, and in Step 306, the calibration unit 104 can find a rectangle including the each image point of at least one image point of the all image points of the first image FI easily according to the first rectification coordinates of the each image point of the all image points of the first image FI and the all information corresponding to the plurality of rectangles formed within the second image SI. That is to say, in Step 306, burden for the calibration unit 104 determining whether the each image point of the at least one image point of the all image points is located within a corresponding rectangle is less than burden for the calibration unit 104 determining whether the each image point of the at least one image point of the all image points is located within a corresponding triangle. Thus, in Step 306, the calibration unit 104 can find the rectangle including the each image point of at least one image point of the all image points without complicated operation according to the first rectification coordinates of the each image point of the at least one image point of the all image points.

Figure 8:
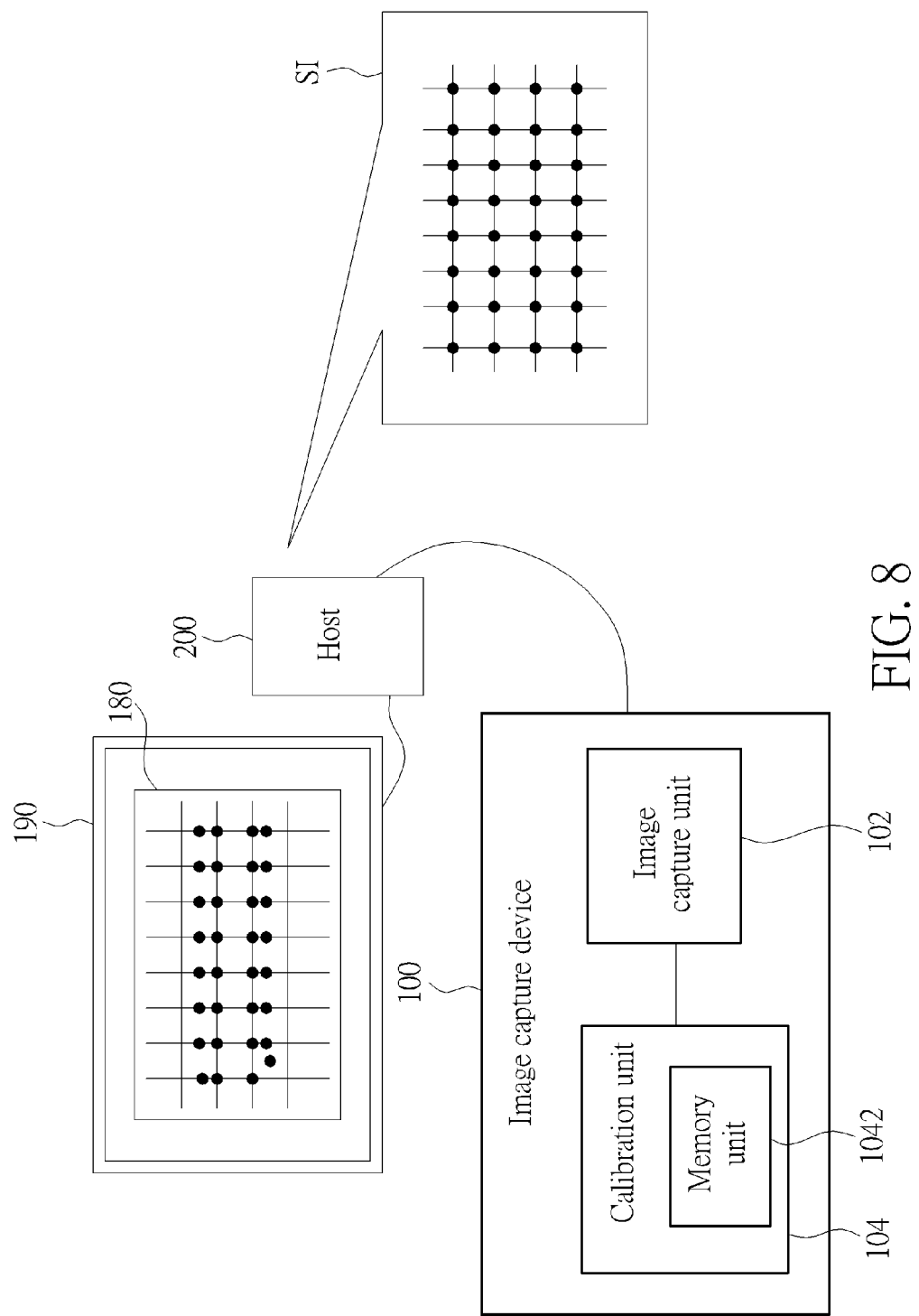
FIG. 8 is a diagram illustrating the feature points of the second image being all located on grids.

In addition, in another embodiment of the present invention, the host 200 can repeatedly adjusts positions of feature points of the programmable target calibration pattern 180 displayed on the display screen 190 until feature points of the second image SI are located on corresponding predetermined positions (e.g. as shown in FIG. 8, after the positions of the feature points of the programmable target calibration pattern 180 are repeatedly adjusted, the feature points of the second image SI are all located on grids (that is, the feature points of the second image SI are all located on corresponding predetermined positions)). Because the feature points of the second image SI are located on the corresponding predetermined positions, the calibration unit 104 does also not need the memory unit 1042 with high capacity to store all information corresponding to the positions of the plurality of feature points within the second image SI, and in Step 306, the calibration unit 104 can find the rectangle including the each image point of at least one image point of the all image points easily according to the first rectification coordinates of the each image point of the at least one image point of the all image points and all information corresponding to the positions of the plurality of feature points within the second image SI.

To sum up, the image capture device and the calibration method first utilize the calibration unit to execute the global calibration operation on the original coordinates of the all image points of the image captured by the image capture unit to generate the first rectification coordinates of the all image points of the image, and then utilize the calibration unit to find the rectification equation corresponding to the geometric graph including the each image point of the at least one image point of the all image points of the image according to the first rectification coordinates of the each image point of the at least one image point of the all image points of the image to rectify the first rectification coordinates of the each image point of at least one image point of the all image points of the image to the second rectification coordinates of the each image point of at least one image point of the all image points of the image. Because the rectification equation corresponding to the geometric graph including the each image point of the at least one image point of the all image points is only applied to the geometric graph including the each image point of the at least one image point of the all image points, the present invention can boost accuracy of the second rectification coordinates of the each image point of the at least one image point of the all image points through the rectification equation corresponding to the geometric graph including the each image point of the at least one image point of the all image points.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method of an image capture device, wherein the image capture device comprises at least one image capture unit and a calibration unit, the calibration method comprising:
   capturing a first image by an image capture unit of the at least one image capture unit;
   executing a global calibration operation on original coordinates of all image points of the first image by the calibration unit to generate first rectification coordinates of the all image points of the first image;
   finding a geometric graph comprising each image point of at least one image point of the all image points according to first rectification coordinates of the each image point of the at least one image point of the all image points by the calibration unit; and
   rectifying the first rectification coordinates of the each image point of the at least one image point of the all image points to second rectification coordinates of the each image point of the at least one image point of the all image points according to a rectification equation corresponding to the geometric graph by the calibration unit.

2. The calibration method of claim 1, wherein the geometric graph is a triangle or a rectangle.

3. The calibration method of claim 1, wherein the each image point of the at least one image point of the all image points corresponds to a pixel of the image capture unit.

4. The calibration method of claim 1, further comprising:
   generating a second image comprising a calibration pattern by the image capture unit, wherein the calibration pattern comprises a plurality of feature points;
   dividing the calibration pattern of the second image into a plurality of geometric graphs according to the plurality of feature points of the calibration pattern of the second image by the calibration unit; and
   determining a rectification equation corresponding to each geometric graph of the plurality of geometric graphs according to coordinates of feature points comprised in a target geometric graph corresponding to the each geometric graph of the plurality of geometric graphs and coordinates of feature points comprised in the each geometric graph by the calibration unit, wherein the target geometric graph is comprised in a target calibration pattern.

5. The calibration method of claim 4, wherein the rectification equation corresponding to the each geometric graph is stored in a memory unit of the calibration unit.

6. The calibration method of claim 4, wherein the calibration pattern corresponds to a programmable target calibration pattern displayed on a display screen, and a host electrically connected to the display screen and the image capture device adjusts positions of a plurality of feature points of the programmable target calibration pattern displayed on the display screen to make the plurality of geometric graphs be a plurality of rectangles.

7. The calibration method of claim 4, wherein the calibration pattern corresponds to a programmable target calibration pattern displayed on a display screen, and a host electrically connected to the display screen and the image capture device adjusts positions of a plurality of feature points of the programmable target calibration pattern displayed on the display screen to make the plurality of feature points of the calibration pattern be located on predetermined positions of the second image.

8. The calibration method of claim 4, wherein the calibration unit executes the global calibration operation on the original coordinates of the all image points of the first image to make first rectification coordinates of each image point of the all image points match corresponding coordinates of the target calibration pattern.

9. An image capture device with a calibration function, the image capture device comprising:
   at least one image capture unit, wherein an image capture unit of the at least one image capture unit captures a first image; and
   a calibration unit coupled to the at least one image capture unit for executing a global calibration operation on original coordinates of all image points of the first image to generate first rectification coordinates of the all image points of the first image, finding a geometric graph comprising each image point of at least one image point of the all image points according to first rectification coordinates of the each image point of the at least one image point of the all image points, and rectifying the first rectification coordinates of the each image point of the at least one image point of the all image points to second rectification coordinates of the each image point of the at least one image point of the all image points according to a rectification equation corresponding to the geometric graph.

10. The image capture device of claim 9, wherein the geometric graph is a triangle or a rectangle.

11. The image capture device of claim 9, wherein the each image point of the at least one image point of the all image points corresponds to a pixel of the image capture unit.

12. The image capture device of claim 9, wherein the image capture unit further generates a second image comprising a calibration pattern, wherein the calibration pattern comprises a plurality of feature points, the calibration unit further divides the calibration pattern of the second image into a plurality of geometric graphs according to the plurality of feature points of the calibration pattern of the second image, and determines a rectification equation corresponding to each geometric graph of the plurality of geometric graphs according to coordinates of feature points comprised in a target geometric graph corresponding to the each geometric graph of the plurality of geometric graphs and coordinates of feature points comprised in the each geometric graph, wherein the target geometric graph is comprised in a target calibration pattern.

13. The image capture device of claim 12, wherein the rectification equation corresponding to the each geometric graph is stored in a memory unit of the calibration unit.

14. The image capture device of claim 12, wherein the calibration pattern corresponds to a programmable target calibration pattern displayed on a display screen, and a host electrically connected to the display screen and the image capture device adjusts positions of a plurality of feature points of the programmable target calibration pattern displayed on the display screen to make the plurality of geometric graphs be a plurality of rectangles.

15. The image capture device of claim 12, wherein the calibration pattern corresponds to a programmable target calibration pattern displayed on a display screen, and a host electrically connected to the display screen and the image capture device adjusts positions of a plurality of feature points of the programmable target calibration pattern displayed on the display screen to make the plurality of feature points of the calibration pattern be located on predetermined positions of the second image.

16. The image capture device of claim 12, wherein the calibration unit executes the global calibration operation on the original coordinates of the all image points of the first image to make first rectification coordinates of each image point of the all image points match corresponding coordinates of the target calibration pattern.

* * * * *